United States Patent [19]

Cooper

[11] 4,127,294
[45] Nov. 28, 1978

[54] PROTECTIVE BUMPER FOR VEHICLE BODY

[76] Inventor: Charles Cooper, 2334 Somervell St., Fort Eustis, Va. 23602

[21] Appl. No.: 639,485

[22] Filed: Dec. 10, 1975

[51] Int. Cl.² .............................................. B60R 19/08
[52] U.S. Cl. .................................... 293/62; 293/1; 293/71 R; 293/DIG. 4; 114/219
[58] Field of Search .............. 293/1, 60, 62, 71 R, 293/71 P, 70, DIG. 4, DIG. 6; 52/716–718; 114/219; 267/139–141; 24/13

[56] References Cited

U.S. PATENT DOCUMENTS

| | | | |
|---|---|---|---|
| 1,709,494 | 4/1929 | Shoemaker | 293/71 P |
| 2,000,466 | 5/1935 | Howard | 52/717 X |
| 2,157,001 | 5/1939 | Morley | 293/DIG. 4 |
| 2,536,551 | 1/1951 | Johnson | 114/219 |
| 3,419,458 | 12/1968 | Brooks et al. | 293/DIG. 4 |
| 3,540,403 | 11/1970 | Russell | 293/71 X |
| 3,687,502 | 8/1972 | Loew | 293/1 |
| 3,721,433 | 3/1973 | Sobel | 293/71 R X |
| 3,802,727 | 4/1974 | Beckley | 293/71 R X |

*Primary Examiner*—Robert B. Reeves
*Assistant Examiner*—Charles A. Marmor

[57] ABSTRACT

A protective bumper for vehicle bodies is demountably attachable to vehicle bodies by suction cups. The demountable bumper includes either a light-weight body made of cellular polystyrene or inflatable tubes made of plastic. At least two suction cups are provided for fixing the demountable bumper to a body of a vehicle. In the tubular version, the suction cups are fixed to that one of two tubes which is to be positioned above the other on a vehicle, the lower of the two tubes is preferably of a somewhat larger diameter than the tube associated with the suction cups. In the cellular polystyrene embodiment, the lower portion of that surface of the body, which is to address the side of a vehicle, is formed with at least one curved protrusion. The suction cups in this instance are desirably positioned above the protrusion.

8 Claims, 9 Drawing Figures

U.S. Patent  Nov. 28, 1978  Sheet 3 of 3  4,127,294
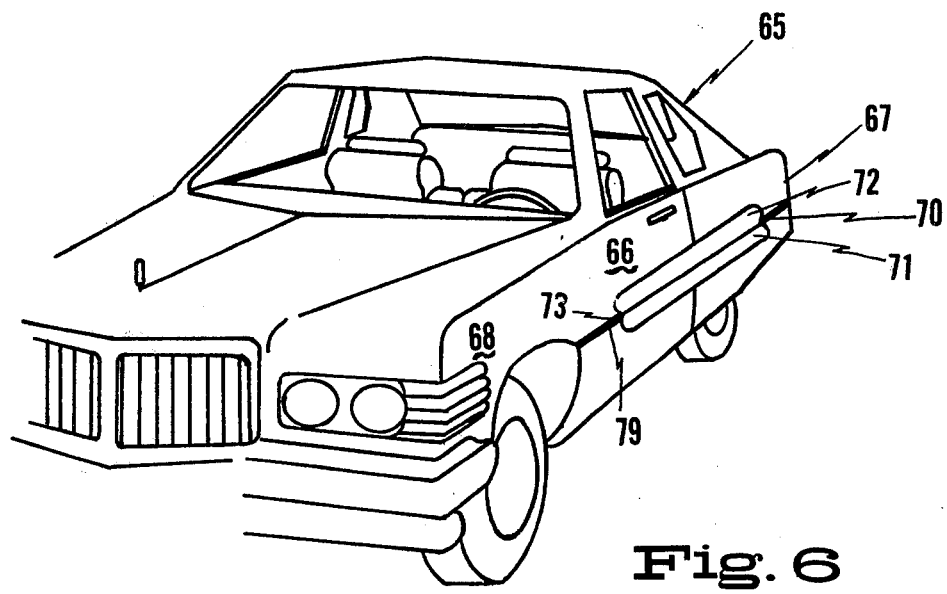
Fig. 6
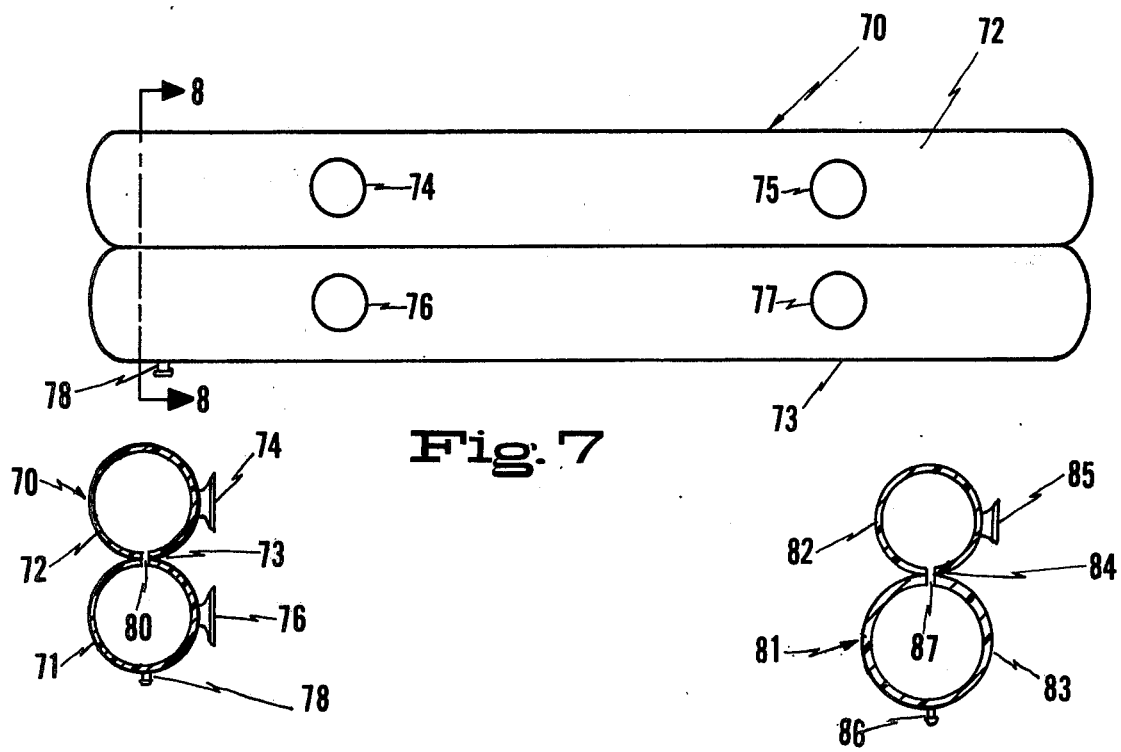
Fig. 7
Fig. 8
Fig. 9

PROTECTIVE BUMPER FOR VEHICLE BODY

BACKGROUND OF THE INVENTION

This invention relates to protective bumpers for the body of vehicles. The invention is concerned more particularly with protective bumpers for bodies of vehicles which may be demountably attached to the vehicle by suction cups.

It is known from U.S. Pat. No. 3,472,546, issued Oct. 14, 1969 to Samuels to provide a protective side bumper for automobiles in the form of buffer strips having a trapezoidal shape in cross section. The buffer strips are formed of a flexible cushioning body made in part of an elastomer, such as rubber. The strips include stiffening members within the body and are provided with hooks or the like, at the ends thereof, to serve as a means for fixing the strip to a door of an automobile or the like, the hooks being designed to fit about the sides of a door. The buffer strips according to the Samuels invention can be positioned and held against portions of an automobile body by magnets which are embedded in the body of elastomeric material near that surface of the strips which are to address an outwardly facing surface of the vehicle. The strips so constructed have the distinct shortcoming of being able to cover only a door when the hook mounting technique is used and of being relatively heavy in the embodiment which requires magnets. The latter version is limited to use in conjunction with vehicle bodies made of magnetizable material.

It is known from U.S. Pat. No. 2,734,765 to Henderson et al., issued Feb. 14, 1956 to construct a door protecting accessory for vehicles of a relatively narrow elongated body formed of hard rubber. The accessory is provided with a series of integral suction cups to effect the demountable connection of the accessory to a door of an automobile. The suction cups have mean diameters which are considerably greater than the vertical extending width of the accessory. A strip of metal, which acts as a reinforcement, is provided along the outwardly facing portion of the accessory. This particular device has a number of disadvantages. The accessory is relatively heavy because of the specific gravity of hard rubber and the metal reinforcing strip. The suction cups consequently must be relatively large and the force receiving surface of the accessory very narrow. This known accessory is neither inexpensive nor easy to construct.

SUMMARY OF THE INVENTION

It is an object of the present invention to provide a protective bumper for vehicle bodies which is extremely light in weight.

It is another object of the present invention to provide a protective bumper for vehicle bodies which is both inexpensive and easy to manufacture.

It is a further object of the present invention to provide a protective bumper for vehicle bodies which can be readily mounted and demounted and can be stored in the trunk of a vehicle.

It is yet another object of the present invention to provide a protective bumper for bodies of vehicles which can readily be assembled by a vehicle owner to suit his particular needs.

It is yet a further object of the present invention to provide a protective bumper for vehicles which overcomes the disadvantages and shortcomings mentioned above.

The foregoing objects are achieved in accordance with a first embodiment of the present invention by providing a protective bumper for a vehicle body, the bumper having at least the major portion of its body made of cellular polystyrene. At least two such suction cups are provided for demountably positioning the bumper on an outer surface of a vehicle, the suction cups being fixed to the body by spears which are held in place by a suitable adhesive or the like. The spears can be positioned in the polystyrene body portion by a user or automotive dealer in order to obtain the best orientation of the particular vehicle sought to be protected.

The foregoing objects are achieved in accordance with a second embodiment of the present invention by providing a protective bumper in the form of at least two interconnected inflatable tubular members, preferably made of plastic, which are positionable against an outer surface of a vehicle by at least two suction cups. The suction cups are integral with that one of the tubular members which is to be uppermost. The tubular members are joined along a substantially line abutment. An opening is provided between the inner spaces of the respective tubular members for allowing air to flow from one to the other, a mouthpiece being provided for inflating the tubular members.

BRIEF DESCRIPTION OF THE DRAWING

FIG. 6 is a partial, pictorial view of an automobile with a second embodiment of the present invention in place along a side of the automobile.

FIG. 7 is a back plan view of the second embodiment of a protective bumper according to the present invention.

FIG. 8 is a cross-sectional view of the second embodiment of a protective bumper according to the present invention, the section being taken along section line 8—8 of FIG. 7.

FIG. 9 is a cross-sectional view of a variant of the second embodiment of a protective bumper according to the present invention.

DETAILED DESCRIPTION OF THE PREFERRED EMBODIMENTS

Figure 1:
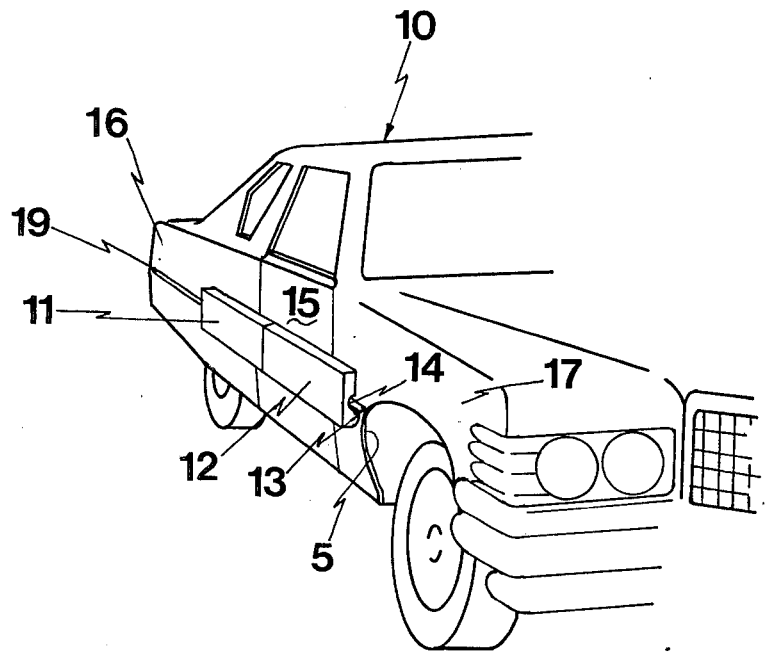
FIG. 1 is a partial, pictorial view of an automobile, two protective bumpers according to a first embodiment of the present invention being shown in place along one side of the automobile.
Figure 2:
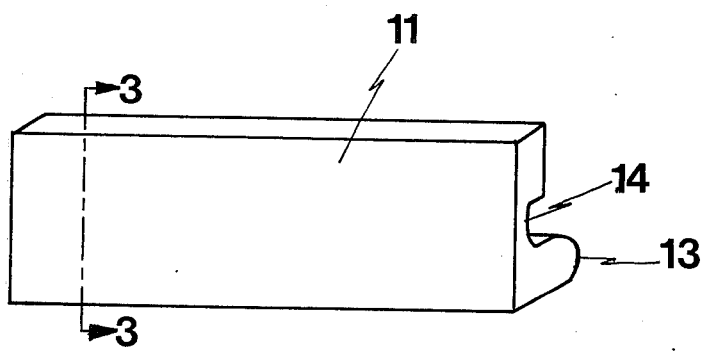
FIG. 2 is a perspective view of a single protective bumper according to the first embodiment of the present invention.
Figure 3:
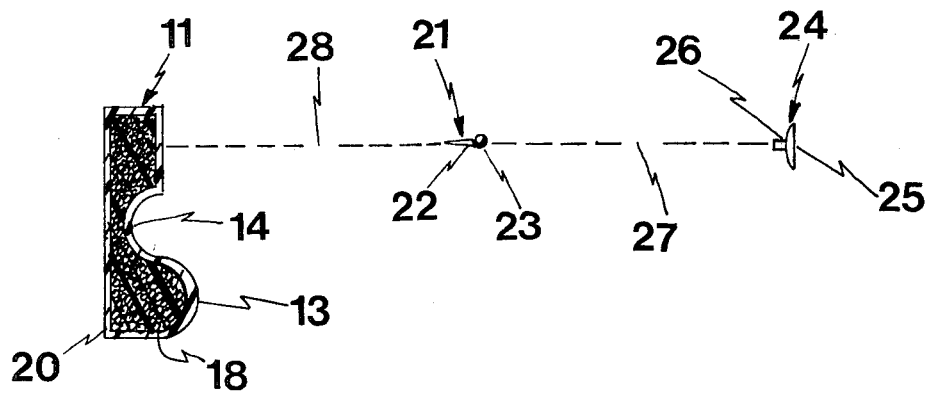
FIG. 3 is a cross-sectional view of the first embodiment of a protective bumper according to the present invention, the section being taken along section line 3—3 of FIG. 2.

Referring to FIGS. 1-3, an automobile 10 is provided with two protective, demountable bumpers 11 and 12 shown abutted to one another. Each of these protective bumpers includes a longitudinal protrusion 13 having a curved surface positioned below a groove or notch 14 which extends along that surface of each of the bumpers 11 and 12, which is to address an outer surface of a vehicle. The notch 14 is preferably arcuate in cross section, as shown, so as not to weaken the bumpers 11 and 12 and is positioned midway between the respective top and bottom edges thereof. The notch 14 is provided for the purpose of allowing conventional trim strips, often found on automobiles, to be accommodated, while allowing the inwardly facing surface of the protective bumpers 11 and 12 to fit closely to an outer surface of a side and/or door of the automobile 10. It is to be appreciated that in many instances the notch 14 need not be present.

As shown in FIG. 1, the protective bumpers 11 and 12 are positioned so that one end of each of these bumpers abuts an end of the other bumper approximately midway along a door 15 of the automobile 10. The more rearwardly positioned bumper 11 extends over at least part of a rear fender 16 of the automobile 10, while the forwardly positioned bumper 12 extends over at least part of a front fender 17 of the automobile 10. The bumpers 11 and 12, in a practical example, are approximately 36 inches long, 8 inches wide and substantially 3 inches thick. Thus, the bumpers can be easily stored in the trunk of an automobile.

The body portions of the bumpers 11 and 12 are made of cellular polystyrene, thereby assuring that the bumpers will be light and sturdy. As shown in FIG. 3, the protective bumper 11 is preferably provided with an interior portion 18 formed of cellular polystyrene. The protrusion 13 is likewise of cellular polystyrene and is integral with the interior portion 18. The interior portion 18 is provided on its outwardly facing surfaces as well as along its ends and sides with a layer, coating or the like of a somewhat more dense plastic material 20. It is to be appreciated that the coating of more dense plastic material 20 need not be present, but is preferred so as to provide a measure of protection for the relatively softer cellular polystyrene portion 18 of the bumper 11. The coating 20 may, if desired, extend over only part of the surfaces of the bumpers 11 and 12.

The protective bumpers 11 and 12 are demountably fixed to the automobile 10 by at least two suction cup devices, which as a practical matter may have small suction cups, for example, of about 2 inches in diameter. As shown in FIG. 3, a pin member 21 having a spear portion 22 and a head 23 in the form of a sphere is provided for fixing a suction cup device 24 to the cellular polystyrene portion 18 of the protective bumper 11. The suction cup device 24 includes a suction cup 25 and extension 26 which is provided with a bore (not visible) having a diameter somewhat less than the diameter of the spherical head 23 of the pin 21. Thus the suction cup device 24 can be placed over the head 23 of the pin 21, as intended to be shown by the arrowheaded, dashed line 27. The pin 21 is to be placed into the cellular polystyrene portion 18 of the protective bumper 11 near one of its ends. The spear portion 22 of the pin 21 is simply stuck into the cellular polystyrene portion 18 near one end of the protective bumper 11 above the notch 14. In some instances, the spear portion 22 may be provided with hook members in order to make withdrawal difficult once it is in place. In other instances, the spear portion 22 may be covered with an epoxy resin or other adhesive-like material when initially placed into the polystyrene portion 18 so as to become permanently fixed in this particular position. At least one respective other suction cup device, with its associated pin, would be required for each of the protective bumpers 11 and 12. This second suction cup device would be fixed to the cellular polystyrene portion 18 near the other end of the protective bumper 11 in order to provide adequate means for removably fixing the protective bumper 11 to the automobile 10. It is to be understood that the protective bumper 12 is provided with similar suction cup devices similarly placed. It is to be appreciated that an automobile dealer or a user may insert the pins into the body portions of the bumpers 11 and 12 at any number of places and in as great a number as desired to assure good positioning of the bumpers.

Figure 4:
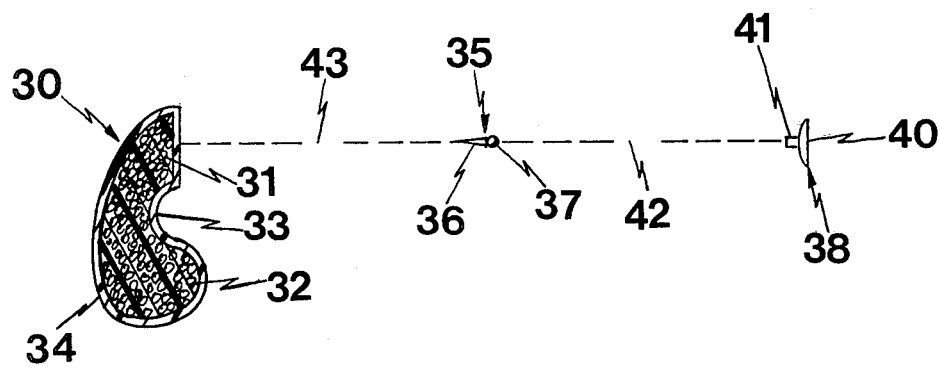
FIG. 4 is a cross-sectional view of a first variant of the first embodiment of a protective bumper constructed in accordance with the present invention.

Turning to FIG. 4, a variant of the protective bumper can be seen. As shown in FIG. 4, a protective bumper 30 may include a cellular polystyrene body portion 31, a longitudinally extending arcuate protrusion 32 and, if desired, a longitudinally extending groove or notch 33 to accommodate trim strips. The protective bumper 30 further includes, if desired, a layer or coating of dense plastic material 34 which protects the polystyrene body portion 31 and extends over its major surfaces and along the longitudinally extending top and bottom edges. In some cases, the coating 34 may extend over portions of the surfaces. The construction of the protective bumper 30 corresponds very closely to that shown in FIG. 3, its essential difference being that the outwardly facing surface of the protective bumper 30, which is to face away from a vehicle, is defined by a gentle, arcuate curve. The cellular polystyrene body portion 31 of the protective bumper 30 is also constructed so that its outwardly positioned surface adjacent the layer 34 is curved in the same manner as the outwardly facing surface of the layer 34. The protective bumper 30 is provided with at least two suction cup devices to effect its demountable attachment to the side of an automobile. As shown in FIG. 4, a pin 35 having a spear portion 36 and a spherical head 37 is provided for attaching a suction cup device 38 to the cellular polystyrene body portion 31 of the protective bumper 30 above the notch 33. The suction cup device 38 includes a suction cup 40 and an extension 41 having a bore (not visible) therein. The diameter of this bore is somewhat less than the diameter of the head 37 so that the suction cup device 38 may be fixed to the head 37 of the pin 35, as suggested by the dashed line 42. The pin 35, in turn, is pushed, as diagrammatically indicated by the dashed line 43, into the cellular polystyrene body portion 31 of the protective bumper 30 above the notch 33 so as to fix the suction cup device 38 in place. The spear portion 36 of the pin 35 may be provided with hook-like members for the purpose of keeping the pin 35 in place or may be provided on its surface with an epoxy resin or other adhesive which, when it solidifies, fixes the pin 35 to the cellular polystyrene portion 31 to the protective bumper 30. It is to be appreciated that at least one other suction cup device is provided near the other end of the protective bumper 30. In practice, as many suction cup devices may be used as desired and these can be positioned to suit the particular needs of any given vehicle.

Figure 5:
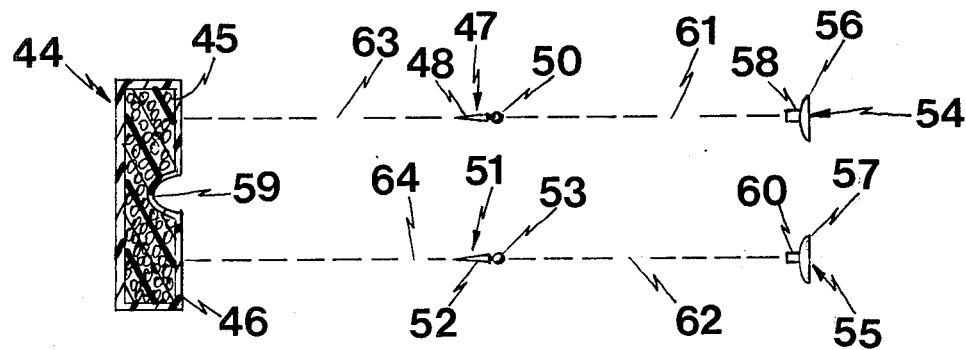
FIG. 5 is a cross-sectional view of a second variant of the first embodiment of a protective bumper according to the present invention.

In FIG. 5, a further variant of the first embodiment of the invention is shown.

As shown in FIG. 4, a protective bumper 44 includes a cellular polystyrene body portion 45 which, in cross section, has a rectangular shape. In this regard, it is similar to the interior body portion 18 of the variant shown in FIG. 3, differing mainly in that no protrusion 13 is provided. The protective bumper 44 includes a layer of dense plastic material 46 which covers the outwardly facing surfaces of the cellular polystyrene body portion 45 as well as its longitudinally extending upper and lower edges and its vertically extending ends to provide some measure of protection for the body portion 45. While the protective bumper 44 as shown in FIG. 5 is shown as having a flat outwardly facing surface, it is to be appreciated that its outwardly facing surface could be curved in the same fashion as the outwardly facing surface of the protective bumper 30 of FIG. 4.

The protective bumper 44 is demountably fixable to an automobile by a plurality of suction cup devices. The plurality, in this instance, desirably should be constituted by at least three and preferably four suction cup devices. Two of these suction cup devices 54 and 55 are visible in FIG. 5. A first pin 47 is provided for fixing the suction cup device 54 to the cellular polystyrene body portion 45 of the protective bumper 44. The pin 47 includes a spear portion 48 and a spherical head 50. A second pin 51 having a spear portion 52 and a spherical head 53 is also provided. The respective pins 47 and 51 are fixed, as suggested by the dashed lines 61 and 62, to respective bores (not visible) in extensions 58 and 60 which form respectively parts of the suction cup devices 54 and 55. The suction cup devices 54 and 55 have respectively suction cups 56 and 57, which are to be positioned against the side of a vehicle. It is to be appreciated that additional suction cup devices (not shown) are provided along the length of the bumper 44, as many being used as desired. The spear portions 48 and 52 of the pins 50 and 51, as well as spear portions of whatever other pins are used, are pushed into the polystyrene body portion 45 of the bumper 44. As in the variants shown in FIGS. 3 and 4, the pins are held in place by epoxy resin or another adhesive material or by outwardly extending hooks.

As illustrated, the bumper 44 is provided with a longitudinally extending groove or slot 59 which is to accommodate trim strips of automobiles. It is to be appreciated, however, that the slot 59 in most instances need not be present in this variant because the suction cup devices may hold the bumper 44 in sufficient shaped relation to a vehicle side that trim strips do not touch the bumper 44. The outwardly, left-facing major surface of the bumper 44 is shown as being flat, but may be curved in the fashion of the bumper 30 (FIG. 4).

Referring to FIGS. 6-8, an automobile 65 (FIG. 6) is illustrated with a second embodiment of a protective bumper 70 shown in place against a side of the automobile 65. As illustrated, the protective bumper 70 extends along the length of a door 66 of the automobile 65 and partially along the rear fender 67 and the front fender 68 of the automobile 65. The protective bumper 70 includes two interconnected, inflatable, tube-like members 71 and 72 which are made of a thin plastic material. Each of the two tube-like members 71 and 72 is circular in cross section and may be, for example, about 4 inches in diameter. The tube-like members 71 and 72 are joined along a substantially line abutment in a conventional manner so as to define a space 73 between portions of their respective circumferences. The space 73 provides an accommodation for trim strips. As best seen in FIG. 7, the uppermost tubular member 72 is provided with two spaced-apart 2-inch suction cups 74 and 75 which are permanently attached to the tubular member 72 by an epoxy resin or other suitable adhesive. The lowermost tubular member 73 is provided with similar 2-inch suction cups 76 and 77 which are positioned respectively in a downwardly spaced relationship from the suction cups 74 and 75. The suction cups 76 and 77 are connected to the tubular member 71 by the same technique and means as the suction cups 74 and 75 are connected to the tubular member 72.

As visible in FIG. 8, a mouthpiece 78 is provided in the lower tubular member 73 to allow the protective bumper 70 to be inflated. An opening 80 is provided between the tubular member 72 and the tubular member 73 so that the tubular member 72 may be inflated by air passing into it from the tubular member 71. The mouthpiece 78 is desirably provided with a plug member (not shown) or the like for effecting its closing subsequent to the inflating of the protective bumper 70. It is to be appreciated that in same instances a valve arrangement could be provided for effecting the closure of the mouthpiece 78 and, if desired, a valve arrangement could be provided to allow the protective bumper 70 to be inflated from a source of pressurized air.

A variant of the embodiment of the present invention illustrated in FIGS. 6-8 is illustrated in cross section in FIG. 9 which shows a protective bumper 81 formed of two inflatable, flexible, tube-like members 82 and 83 which are substantially circular in cross section, are of thin plastic, and abut along a line throughout their length so as to define a space 84 which can readily accommodate trim strips often found on the sides of automobiles. The upper tube-like member 82 is provided with a pair of suction cups similar to the arrangement of suction cups associated with the tube-like member 72 (FIG. 7), only one suction cup 85 being visible in FIG. 9. The tube-like member 83 has a somewhat larger diameter than the tubular member 82 and thus can readily position itself against the side of an automobile. In this variant, fewer suction cups are necessary. The lower of the two tube-like members 82 and 83 is provided with a mouthpiece 86 for inflating the bumper 81, an opening 87 being provided between the inner spaces of the tube-like members 83 and 82 so that the tube-like member 82 can be inflated by air passing into it from the tube-like member 83. The mouthpiece 86 can be provided with a plug for closing the same. A conventional valve arrangement could be provided in place of the mouthpiece 86.

The bumpers 70 and 81 shown respectively in FIGS. 8 and 9 may, when deflated, be folded or rolled up so as to be easily stored in the trunk of an automobile. Thus, these bumpers can be relatively long when inflated without posing a storage problem.

While two embodiments and several variants of protective bumpers have been shown for purposes of illustration, it is to be appreciated that numerous other variants and embodiments of the present invention are possible without departing from the spirit and scope of the invention, the scope being defined in the appended claims.

What is claimed is:

1. A removable, protective bumper for protecting the exterior of a parked vehicle, the bumper comprising a horizontally extending elongated body having a vertical width, said body being of cellular plastic material; a protective layer of a plastic material having a density greater than the density of cellular plastic material extending over at least a portion of said body; at least two suction cups fixed to said body for holding said body on a vehicle, each of said suction cups having a diameter smaller than said vertical width of said body, said suction cups being carried on pin members which are inserted into said body and have adhesive material thereon for fixing same to said body at selected points.

2. A protective bumper according to claim 1, wherein said protective layer of a plastic material having a density greater than the density of cellular plastic material completely covers said body.

3. A protective bumper according to claim 1, wherein a groove extends along that side of said body which is to address a vehicle for accommodating trim strips thereof.

4. A protective bumper according to claim 1, wherein said body is provided with at least one protrusion extending along its longitudinal length on that side of said body which is to address a portion of an exterior of a vehicle.

5. A protective bumper according to claim 4, wherein said at least one protrusion defines a curved surface which is to touch a portion of the exterior of the vehicle.

6. A protective bumper according to claim 1, wherein said at least two suction cups are constituted by at least four suction cups.

7. A protective bumper according to claim 1, wherein said body has a curved surface which is to face away from a vehicle when the bumper is in place.

8. A protective bumper according to claim 1 wherein said body is of cellular polystyrene.

* * * * *